United States Patent
Reddiar et al.

(10) Patent No.: US 10,951,903 B2
(45) Date of Patent: Mar. 16, 2021

(54) VIDEO ANALYTICS ENCODING FOR IMPROVED EFFICIENCY OF VIDEO PROCESSING AND COMPRESSION

(71) Applicant: Intel Corporation, Santa Clara, CA (US)

(72) Inventors: Palanivel Guruva Reddiar, Chandler, AZ (US); Jill Boyce, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/235,574

(22) Filed: Dec. 28, 2018

(65) Prior Publication Data

US 2019/0141340 A1 May 9, 2019

Related U.S. Application Data

(60) Provisional application No. 62/651,505, filed on Apr. 2, 2018.

(51) Int. Cl.

| | |
|---|---|
| H04N 19/179 | (2014.01) |
| G06F 16/783 | (2019.01) |
| H04N 19/169 | (2014.01) |
| H04N 19/136 | (2014.01) |
| H04N 21/44 | (2011.01) |
| H04N 21/643 | (2011.01) |
| H04N 21/218 | (2011.01) |
| H04N 21/84 | (2011.01) |
| H04N 21/2187 | (2011.01) |
| H04N 19/70 | (2014.01) |

(52) U.S. Cl.
CPC ....... *H04N 19/179* (2014.11); *G06F 16/7837* (2019.01); *H04N 19/136* (2014.11); *H04N 19/188* (2014.11); *H04N 19/70* (2014.11); *H04N 21/2187* (2013.01); *H04N 21/21805* (2013.01); *H04N 21/44008* (2013.01); *H04N 21/64322* (2013.01); *H04N 21/84* (2013.01)

(58) Field of Classification Search
None
See application file for complete search history.

(56) References Cited

U.S. PATENT DOCUMENTS

| | | | | |
|---|---|---|---|---|
| 2007/0200923 A1* | 8/2007 | Eleftheriadis | .......... | H04N 7/152 348/14.08 |
| 2008/0016541 A1* | 1/2008 | Murakami | ............... | H04N 5/76 725/114 |
| 2009/0031381 A1* | 1/2009 | Cohen | ............... | H04L 29/08846 725/115 |

(Continued)

*Primary Examiner* — Edemio Navas, Jr.
(74) *Attorney, Agent, or Firm* — Jaffery Watson Mendonsa & Hamilton LLP

(57) ABSTRACT

Embodiments are generally directed to video analytics encoding for improved efficiency of video processing and compression. An embodiment of an apparatus includes a memory to store data, including data for video streaming, and a video processing mechanism, wherein the video processing mechanism is to analyze video data and generate video analytics, generate metadata representing the video analytics and insert the generated video analytics metadata into a message, and transmit the video data and the metadata to a succeeding apparatus or system in a video analytics pipeline, the video data being compressed video data.

14 Claims, 9 Drawing Sheets

(56) References Cited

U.S. PATENT DOCUMENTS

| | | | | |
|---|---|---|---|---|
| 2012/0195363 A1* | 8/2012 | Laganiere | ........... | H04L 12/6418 375/240.01 |
| 2015/0016712 A1* | 1/2015 | Rhoads | .............. | G06K 9/00208 382/154 |
| 2015/0189005 A1* | 7/2015 | Dubois | ................. | H04L 67/141 709/217 |
| 2015/0350671 A1* | 12/2015 | Alshin | ................. | H04N 19/105 375/240.15 |
| 2015/0373366 A1* | 12/2015 | He | ....................... | H04N 19/521 375/240.16 |
| 2018/0286053 A1* | 10/2018 | Labbe | .................... | G06T 7/194 |

* cited by examiner

VIDEO ANALYTICS ENCODING FOR IMPROVED EFFICIENCY OF VIDEO PROCESSING AND COMPRESSION

RELATED APPLICATIONS

This application is related to and claims priority to U.S. provisional patent application 62/651,505, filed Apr. 2, 2018.

TECHNICAL FIELD

Embodiments described herein generally relate to the field of data processing and, more particularly, video analytics encoding for improved efficiency of video processing and compression.

BACKGROUND

Video streaming has increased in popularity and and usage in a wide variety of applications. Many of video usages includes the application of video analytics to, for example, identify potential elements for processing, such as the identification of potential presence of people, vehicles, dangerous conditions, and other various elements that may be presented in a scene.

An apparatus or system may include a processing pipeline that is to provide analytical operation in multiple stages, and to handle the transport of the video data and analytics. In a conventional operation, at each stage of the processing pipeline, the result of the video analytics is represented by graphics that are overlaid on video frames. For example, the video analytics may be presented by placing a visible rectangular bounding box within a video frame, compressing the resultant video frame, and sending the compressed to the next stage element. Such conventional techniques require video data to be decoded and re-encoded repeatedly for generating compressed bit streams.

This re-encoding of videos is computationally expensive, while encoder latency is considerably high and has a direct impact on the overall system latency. Further, video quality decreases due to multiple re-encoding stages in the processing pipeline, where any overlaid graphics representing the metadata may not be removed from the video frame. Moreover, any mistaken detections and/or classifications may not be easily corrected by further elements in the processing pipeline.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

In some embodiments, an apparatus, system, or process provides for video analytics encoding in an analytics pipeline to provide improved efficiency in video processing and compression.

Figure 1A:
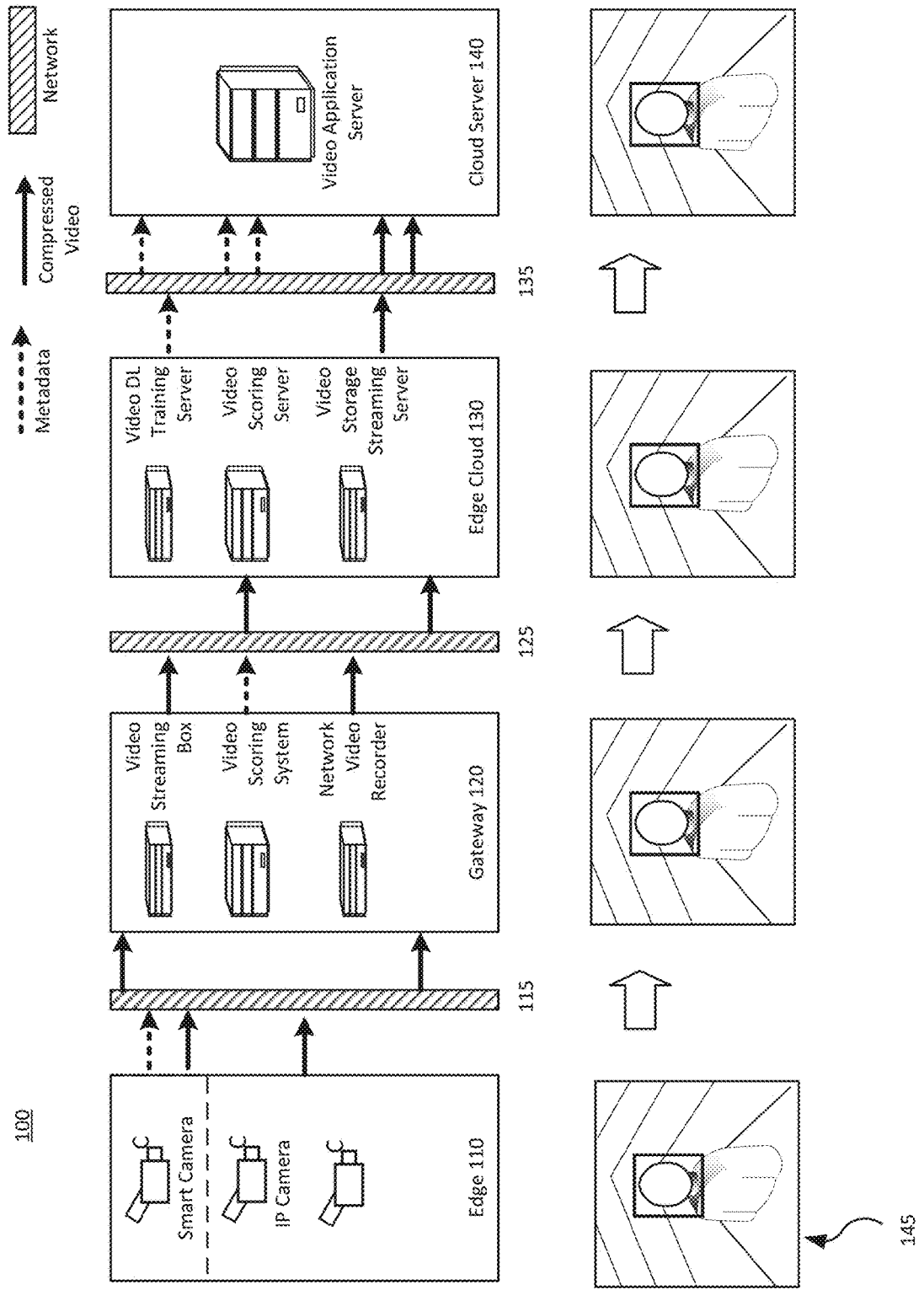
FIGS. 1A and 1B illustrate end-to-end processing of video data according to some embodiments.
Figure 1B:
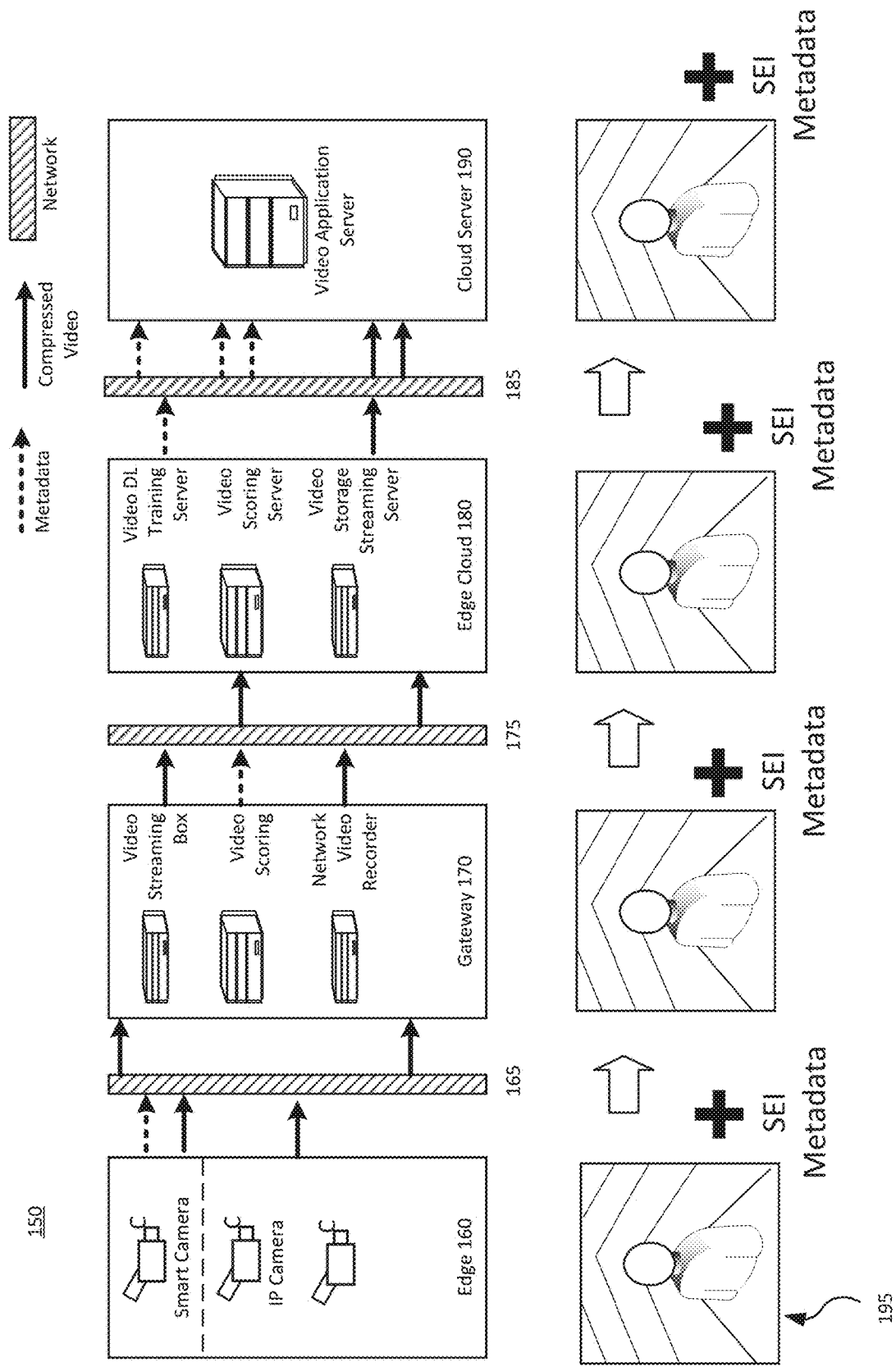

FIGS. 1A and 1B illustrate end-to-end processing of video data according to some embodiments. An end-to-end intelligent video solution involves processing of video data at various stages in an analytics pipeline, each stage being an apparatus or system. In an example as illustrated in FIG. 1, video data is captured and initially analyzed by a camera in an edge stage 110, which may include a smart camera or IP (Internet protocol) camera (referred to in general as an edge camera herein). The analytics pipeline 100 may further have stages including a gateway 120, such as a video streaming box, video scoring server, and a network video recorder; edge cloud 130, such as a video DL (Deep Learning) training server, video scoring server, and video storage streaming server; and cloud servers 140, shown as a video application server. Also illustrated are the interfaces between the stages, such as a first interface 115 between the edge 110 and the gateway 120, a second interface 125 between the gateway 120 and the edge cloud 130, and a third interface between the edge cloud 130 and the cloud servers. It is noted that FIG. 1A illustrates a particular implementation of an analytics pipeline, and a pipeline is not limited to the particular elements shown in FIG. 1.

In the edge stage 110, the edge camera may provide for data capture and initial data processing. In conventional operation, at each of the multiple stages in the analytics pipeline 100, the video data is de-compressed, analyzed using computer vision/machine learning/deep learning methods, and then again compressed and sent to next stage element. For example, as depicted in FIG. 1, the edge camera at the edge stage 110 carries out certain minimal analytics, such as a subject identification indicated by a bounding box, with the result of the analytics being overlaid onto the frame and the resultant video being compressed and sent on via interface 115 to the gateway 120. The gateway then is operable to carry out advanced analytics, with the resultant video frames being compressed and sent to the edge cloud 130 for further analysis and continuing through the analytics pipeline 100.

In conventional techniques, at every stage, graphics representing the metadata is overlaid on the video frame. For example, a visible bounding rectangle generated by a camera in the edge stage 110 is inserted in the video frame 145, and the resultant video frame is compressed and sent to the next stage element, as shown in FIG. 1A. This conventional process creates a requirement for decompressing video stream data, analyzing the decompressed data, adding additional analytics to the video frame, and re-compressing the video stream data for transmission to the next stage.

Figure 3:
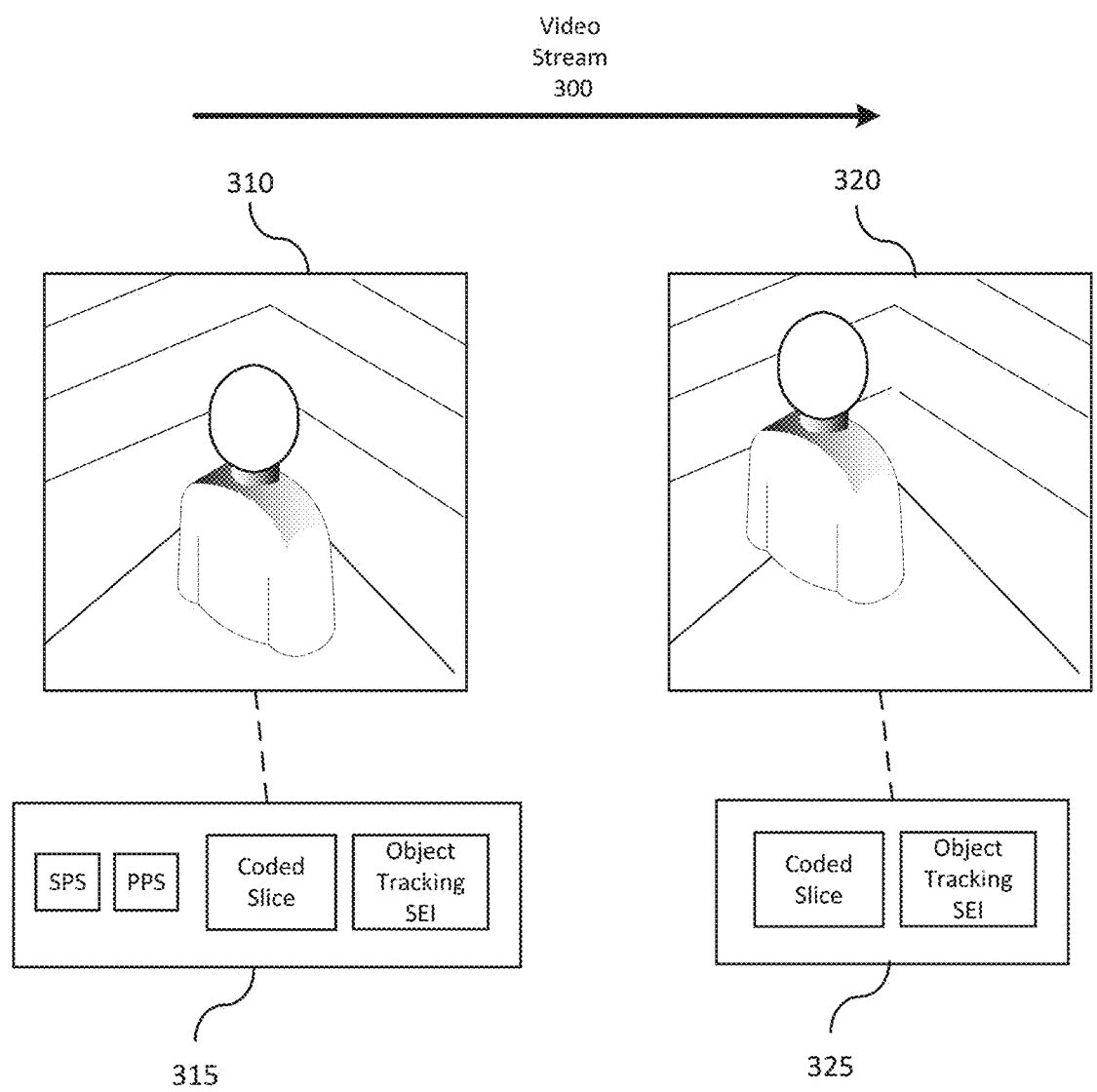
FIG. 3 is an illustration of video frames in a video stream according to some embodiments.

In some embodiments, as illustrated in FIG. 1B the processing and transfer of video data in an analytics pipeline is modified to streamline the processing of video stream data in an analytics pipeline. As shown in FIG. 1B, a video analytics pipeline may include stages such as an edge 160, a gateway 170, edge cloud 180, and cloud servers 190, together with interfaces between the stages, such as a first interface 165 between the edge 160 and the gateway 170, a second interface 175 between the gateway 170 and the edge cloud 180, and a third interface between the edge cloud 180 and the cloud server 190. In some embodiments, an apparatus, system, or process includes the creation of metadata to encode video data analytics, and to transfer the metadata together with the compressed video stream data, wherein the video stream may be encoded as, for example, coded slices in the VCL (Video Coding Layer), to the next stage in the analytics pipeline. In this manner, the generated metadata is made available to each stage by encoding the analytics data as metadata that can accessed separately from the video streaming data. In a particular embodiment, the metadata is encoded in the form of a Supplemental Enhancement Information (SEI) message, which is carried in the Network Abstraction Layer (NAL) of the H.264 and H.265 (HEVC—High Efficiency Video Coding) standards. A new SEI message may be offered and referred to as the Object Tracking SEI to encode the result of the video analytics, as depicted in FIG. 3.

In some embodiments, at stages in an analytics pipeline other than the edge 160, such as the gateway 170 and edge cloud servers 180, the compressed video may be decoded and further analyzed, with the results of the video analytics being added in the bitstream as an object tracking SEI message. In some embodiments, if a pre-existing object tracking SEI message already exists in the bitstream from an earlier stage in the pipeline, then the existing SEI message contents may be modified based on the analytics performed at the later state stage.

In some embodiments, one or more apparatuses or systems in a video analytics pipeline 150 provides one or more of computer vision (referring in general to a computing system obtaining high-level understanding from digital images or video), machine learning (referring in general to a computing system learning based on a set of data, and which may include a neural network), and deep learning (referring in general to machine learning using deep neural networks).

Figure 2:
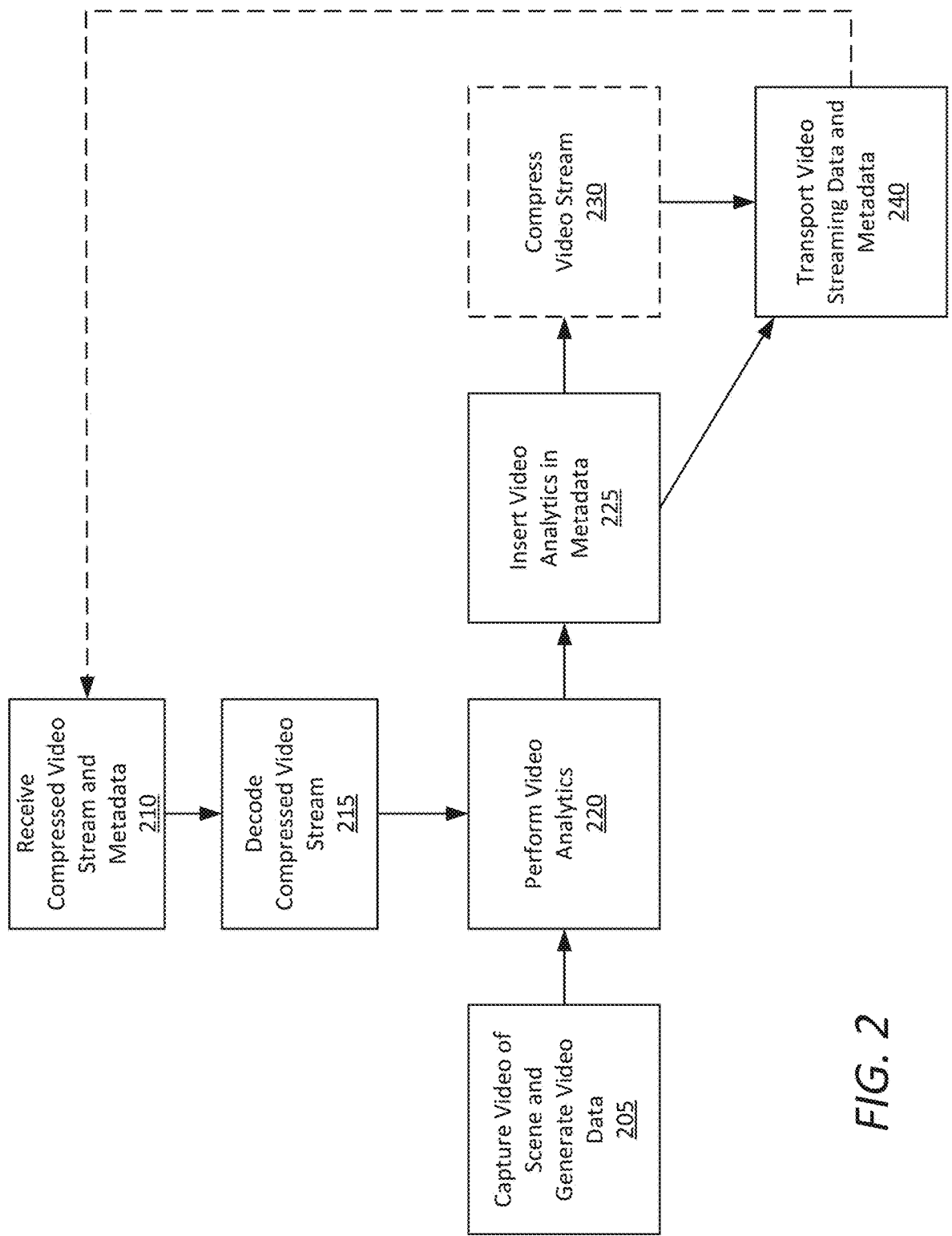
FIG. 2 is an illustration of a process for processing of video data by an apparatus or system in an analytics pipeline according to some embodiments.

FIG. 2 is an illustration of a process for processing of video data by an apparatus or system in an analytics pipeline according to some embodiments. In a video analytics pipeline, such as analytics pipeline 150 illustrated in FIG. 1B, an apparatus or system may provide for efficient video data analysis as shown in FIG. 2. For an edge device or system, such as an edge camera in an edge stage 160 illustrated in FIG. 1B, the edge device or system may operate to capture video of a scene and generate resulting video stream data 205. The process then may continue with performing video analytics, 220, which would generally be limited analysis in an edge device or system, such as the initial identification of one or more subjects in an image. In some embodiments, the edge device or system is to insert the generated video analytics data as metadata in a message 225, wherein the message may be an SEI message. In some embodiments, for an edge device that has generated the video streaming data, the processing may proceed with compressing the video stream 230 and transporting the compressed video streaming data, such as in the VCL, and the metadata to a next stage in the analytics pipeline 240.

Continuing the process illustrated in FIG. 2, in some embodiments, for a device or system receiving video streaming data in an analytics pipeline, such as the gateway 170 or edge cloud 180 stages illustrated in FIG. 1B, may receive the compressed video streaming data and the metadata from an earlier stage 210, such as an edge device or system transporting the video streaming data and metadata 240. The process may continue with decoding the compressed video stream 215 and performing video analytics on the video data 220. In the case of a gateway 120 or edge cloud 130 device or system the analytics may include more complex analytics than is performed by an edge device. In some embodiments, the device or system is to insert the video analytics into metadata 225, such as in an SEI message. In some embodiments, the apparatus or system is to insert the metadata into an existing SEI message that was received from an earlier stage in analytics pipeline. In some embodiments, if there are no errors or other conditions that would require the re-compressing of the video streaming data 230, the apparatus or system may then transport the received compressed video streaming data and the metadata to a following stage in the analytics pipeline 240. In this manner, the apparatus or system is not required in normal circumstances to re-compress the data stream for transmission because of the separation of the analytics data from the video streaming data.

Figure 4:
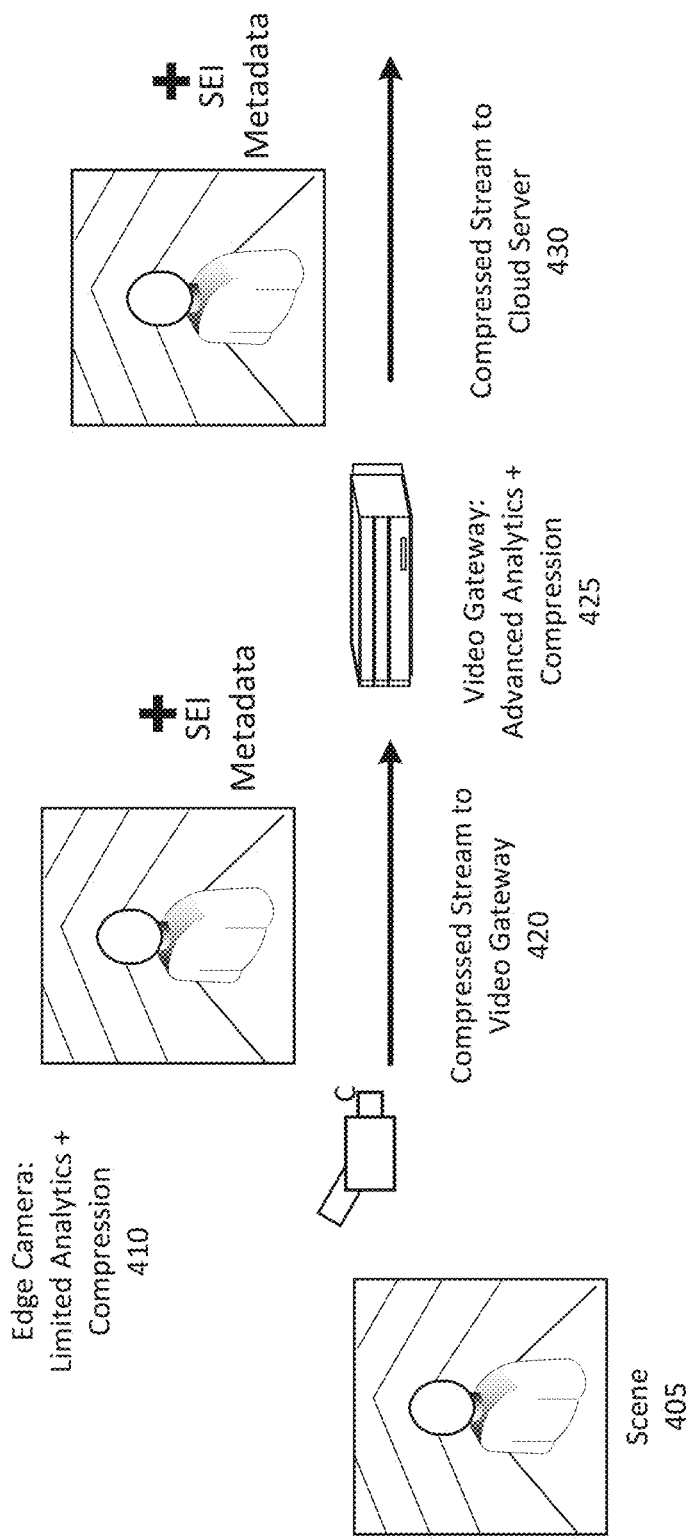
FIG. 4 is an illustration of video analytics operations according to some embodiments.

Additional details that may apply in the generation, analysis, and encoding of video data are illustrated in FIG. 4 below.

FIG. 3 is an illustration of video frames in a video stream according to some embodiments. As illustrated in FIG. 3, is some embodiment an initial frame 310 of a video stream 300 may include data 315 with SPS (Sequence Parameter Set) and PPS (Picture Parameter Set), and further including a coded slice carrying video data and an object tracking SEI message carrying metadata, wherein the metadata includes video analytics data generated by an apparatus or system in an analytics pipeline, such as the analytics pipeline 100 illustrated in FIG. 1B. Each following frame 325 then includes coded slice carrying video data and an object tracking SEI message carrying metadata. In some embodiments, an apparatus or system then is capable of separately accessing the video data and the object tracking SEI containing video analytics data in the form of metadata, thus enabling the handling of video analytics without requiring re-encoding of the video data at each interface between stages.

FIG. 4 is an illustration of video analytics operations according to some embodiments. In some embodiments, a scene 405 is captured by an edge camera 410 to generate video data, wherein the camera may optionally provide limited analytics of the video data, such as to track objects in the video and identify a rectangular bounding box around the objects in the video frame and provide for the compression of the video data for transmission. In some embodiments, the edge camera 410 generates an SEI message with metadata representing the results of the limited analytics, such as metadata representing one or more rectangular bounding boxes is included in an object tracking SEI message as part of the video bitstream, which can be updated for individual pictures. This results in a compressed stream of data to the video gateway plus the SEI metadata 420 to be received at the video gateway 425.

At later stages, such as the gateway or cloud servers, the video portion of the bit stream (e.g. the VCL layer) that had been originally created by an initial encoder, such as at the edge, does not need to be altered at these later stages. At these later stages, video analytics can be performed, such as to detect and track objects and identify a rectangular bounding box of the objects in each picture. The result of the video analytics is represented in the SEI message in the Network Abstraction Layer (NAL of the H.264 and H.265 standards), which is either appended to the VCL portion of the bit stream, or if an object tracking SEI message were already included in the received bit stream from the edge camera, the contents of the SEI message is revised as needed. The video gateway then may provide more complex video analytics that are to be represented by additional SEI metadata, resulting in compressed stream of data plus SEI metadata to the cloud server 430.

Thus, an embodiment of an apparatus, system, or process requires only minimal video processing at a gateway and servers, the processing being to encode the SEI metadata. The video processing is considerably faster with less power consumption compared to a conventional flow. At edge and gateway servers, as the result of the video analytics being known to the CODEC layer, an encoder may use this information to efficiently process the regions of interest in the frames. Any misdetections and/or misclassifications may be rectified by a next element in the processing pipeline as this rectification involves the altering of the respective SEI message only. This may be contrasted to a conventional system, in which analytic data is inserted into the video frame and thus requires modification of the video frame to address issues such as misdetections and misclassifications.

In some embodiments, at a gateway or server in the event of packet loss, the object tracking SEI information may further be used by a decoder for efficient error concealment. Further, in an embodiment standard-compliant bit streams may be produced with inter-operability being maintained, wherein, for example, a third-party decoder may discard the introduced object tracking SEI message.

In a specific example, the following sequence of operations may occur at the gateway:

(1) The incoming bitstream is decompressed and the decoded video frames are sub-sampled (in accordance with the video and analytics requirements);

(2) The object tracking SEI NAL, if present in the incoming bitstream, is also decoded and the decoded contents are stored;

(3) The sub-sampled video frames are analyzed to detect potential objects of interest and tracking their locations within the video frame and the results are compared against the decoded object tracking SEI NAL contents (if present);

(4) In a case in which there are no differences in the comparison, the incoming compressed bit stream is sent to the cloud server for further analysis;

(5) In case in which there are differences identified in the comparison, the updated contents are inserted into the object tracking SEI NAL and the resultant object tracking SEI NAL is appended to the video portion of the bit stream and sent to the cloud server for further analysis;

(6) The object tracking SEI NAL is coded with high priority (using the NALU_PRIORITY_HIGH field in the NAL header), where in scenarios where the available bandwidth between the gateway and cloud server is reduced, the gateway drops the video portion and sends only the object tracking SEI NAL. The decoder at the cloud server uses the contents of the object tracking SEI NAL for efficient error concealment: and (7) There are certain scenarios where re-encoding may be needed at the gateway, such as when multiple streams are decompressed and composited to form a single frame in the case of a network video recorder (NVR). In this scenario, the encoder can use the object tracking SEI NAL contents for efficient video processing (such as more bits to the ROIs identified by the video analytics as an example).

One embodiment of the syntax of the novel object tracking SEI message NAL is shown below in Table 1 and the corresponding semantics information is also provided. In one embodiment, the proposed SEI message carries parameters to describe the bounding box of tracked objects within the compressed video bitstream; in another embodiment, object labels and confidence levels of detected and tracked objects may be provided. The syntax uses persistence of parameters to avoid the need to re-signal information already available in previous SEI messages within the same persistence scope, such as within the same coded video sequence. For example, if one tracked object remains stationary for the current picture relative to a previously coded picture while another tracked object moves during that interval, the bounding box parameters are signaled only for the moving object.

A syntax flag is included to indicate if a coded video sequence is not intended for user viewing, but rather is intended for machine learning applications. For example, this flag could be used when the tracked objects are represented at high quality but areas outside of the tracked objects are represented at very low video quality. Another syntax flag is included to indicate if the motion information (e.g., motion vectors, modes, etc.) were selected in order to accurately track objection motion, rather than to optimize coding efficiency. Further, a syntax flag indicates if bounding boxes may represent the estimated position of occluded or partially occluded objects (versus representing only the visible portion). A flag per tracked object may optionally indicate if the bounding box represents the size and location of an object that is only partially visible within the coded picture. The number of bits of granularity of the confidence level is explicitly signaled, such as up to 16 bits.

TABLE 1

Annotated Region SEI Message Syntax

| | Descriptor |
|---|---|
| annotated_region ( payloadSize ) { | |
|     ar_cancel_flag | u(1) |
|     ar_seq_parameter_set_id | ue(v) |
|     ar_not_optimized_for_viewing_flag | u(1) |
|     ar_true_motion_flag | u(1) |
|     ar_occluded_objects_flag | u(1) |
|     ar_partial_object_flag_present_flag | u(1) |
|     ar_object_label_present_flag | u(1) |

TABLE 1-continued

Annotated Region SEI Message Syntax

| | Descriptor |
|---|---|
| ar_object_detection_confidence_info_present_flag | u(1) |
| if (ar_object_detection_confidence_info_present_flag ) | |
|     ar_object_detection_confidence_precision_num_bits | u(4) |
| if (ar_object_label_present_flag) { | |
|     ar_object_label_language_present_flag | u(1) |
|     if ( ar_object_label_language_ present_flag ) { | |
|         while( !byte_aligned( ) ) | |
|             ar_zero_bit /* equal to 0 */ | f(1) |
|         ar_object_label_language | st(v) |
|     } | |
|     ar_num_cancel_labels | ue(v) |
|     for( i = 0; i < ar_num_cancel_labels; i++ ) { | |
|         ar_cancel_label_idx[ i ] | ue(v) |
|     ar_num_new_labels | ue(v) |
|     for( i = 0; i < ar_num_new_labels; i++ ) { | |
|         ar_label_idx[ i ] | ue(v) |
|         while( !byte_aligned( ) ) | |
|             ar_zero_bit /* equal to 0 */ | f(1) |
|         ar_label[ ar_label_idx [ i ] ] | st(v) |
|     } | |
| } | |
| ar_num_cancel_objects | ue(v) |
| for( i = 0; i < ar_num_cancel_objects; i++ ) { | |
|     ar_cancel_object_idx[ i ] | ue(v) |
| ar_num_objects_minus1 | ue(v) |
| for( i = 0; i <= ar_num_objects_minus1; i++ ) { | |
|     ar_object_idx[ i ] | ue(v) |
|     ar_new_object_flag[ ar_object_idx[ i ] ] | u(1) |
|     if ( !ar_new_object_flag[ ar_object_idx[ i ] ] ) | |
|         ar_bounding_box_update_flag[ ar_object_idx[ i ] ] | u(1) |
|     if( ar_new_object_flag[ ar_object_idx[ i ] && ar_object_label_present_flag { | |
|         ar_object_label_idc[ar_object_idx[ i ] ] | ue(v) |
|     if (ar_partial_object_flag_present_flag) | |
|         ar_partial_object_flag[ ar_object_idx [ i ] ] | u(1) |
|     if( ar_object_bounding_box_update_flag[ ar_object_idx[ i ] ] \|\| | |
|         ar_new_object_flag[ ar_object_idx[ i ] ]) { | |
|         ar_object_top[ ar_object_idx[ i ] ] | u(16) |
|         ar_object_left[ ar_object_idx[ i ] ] | u(16) |
|         ar_object_width[ ar_object_idx[ i ] ] | u(16) |
|         ar_object_height[ ar_object_idx[ i ] ] | u(16) |
|         if ( ar_object_detection_confidence_info_present_flag ) | |
|             ar_object_detection_confidence [ ar_object_idx[ i ] ] | u(v) |
|     } | |
| } | |
| } | |

Annotated Region SEI Message Semantics:

The annotated region SEI message carries parameters to describe annotated regions using bounding boxes representing the size and location of tracked objects within the compressed video bitstream; and also to describe optional elements such as object labels and object detection confidence levels.

ar_cancel_flag equal to 1 indicates that the SEI message cancels the persistence of any previous annotated region SEI message in output order that is associated with one or more primary picture layers to which this SEI applies. ar_cancel_flag equal to 0 indicates that annotated region information follows.

ar_seq_parameter_set_id indicates and shall be equal to the sps_seq_parameter_set_id value of the active SPS. The value of ar_seq_parameter_set_id shall be in the range of 0 to 15, inclusive.

ar_not_optimized_for_viewing_flag equal to 1 indicates that decoded picture is not optimized for user viewing, but for other purposes. ar_not_optimized_for_viewing_flag equal to 0 indicates that the decoded picture is optimized for user viewing.

ar_true_motion_flag equal to 1 indicates that the motion information in the coded picture was selected with a goal of accurately representing object motion for annotated objects. ar_true_motion_flag equal to 0 makes no indication about motion vector accuracy of annotated objects.

ar_occluded_objects_flag equal to 1 indicates that the ar_object_top, ar_object_left, ar_object_width, and ar_object_height[ar_object_idx[i]] syntax elements represent the size and location of an object that may not visible or may be only partially visible in the coded picture. ar_obccluded_objects_flag equal to 0 indicates that the ar_object_top, ar_object_left, ar_object_width, and ar_object_height[ar_object_idx[i]] syntax elements represent the size and location of the visible portion of an object within the coded picture.

ar_partial_object_flag_present_flag equal to 1 indicates that ar_partial_object_flag[ar_object_idx[i]] syntax elements are present in the coded bit stream. ar_partial_object_flag_present_flag equal to 0 indicates that that ar_partial_object_flag[ar_object_idx[i]] syntax elements are not present in the coded bit stream.

ar_object_label_present_flag equal to 1 indicates that the label information corresponding to the annotated objects is present in the coded bit stream. ar_object_label_present_flag equal to 0 indicates that the label information corresponding to the annotated objects is not present in the coded bit stream.

ar_object_detection_confidence_info_present_flag equal to 1 indicates that ar_object_detection_confidence[ ] is present in the bitstream. ar_object_detection_confidence_info_present_flag equal to 0 indicates that ar_object_detection_confidence[ ] is not present in the bitstream.

ar_object_detection_confidence_precision_num_bits indicates the number of bits used to represent ar_object_detection_confidence[ ].

ar_object_label_language_present_flag equal to 1 indicates that the ar_object_label_language is present in the bit stream. ar_object_label_language_present_flag equal to 0 indicates that the ar_object_label_language is not present and that the language of the label is unspecified.

ar_zero_bit shall be equal to zero.

ar_object_label_language contains a language tag as specified by IETF RFC 5646 followed by a null termination byte equal to 0x00. The length of the ar_object_label_language syntax element shall be less than or equal to 255 bytes, not including the null termination byte.

ar_num_cancel_labels indicates the number of canceled labels associated with the annotated objects. ar_num_cancel_labels shall be in the range of 0 to 255, inclusive.

ar_cancel_label_idx[i] cancels the persistence of the ar_cancel_label_idx[i]-th label. The value of ar_cancel_label_idx[i] shall be in the range of 0 to 255, inclusive.

ar_num_new_labels indicates the total number of new labels associated with the annotated objects that will be signaled. The value of ar_num_new_labels shall be in the range of 0 to 255, inclusive.

ar_label_idx[i] indicates the index to the label associated with the corresponding annotated object. The value of ar_label_idx[i] shall be in the range of 0 to 255, inclusive.

ar_label[ar_label_idx[i]] contains the label of the bounding box. The length of the ar_label[ar_label_idx[i]] syntax element shall be less than or equal to 255 bytes, not including the null termination byte.

ar_num_cancel_objects indicates the number of canceled annotated objects. ar_num_cancel_objects shall be in the range of 0 to 255.

ar_cancel_object_idx[i] cancels the persistence of the ar_cancel_object_idx[i]-th annotated object. The value of ar_cancel_object_idx[i] shall be in the range of 0 to 255, inclusive.

ar_num_objects_minus1 plus 1 indicates the total number of annotated objects being tracked in the current decoded picture. ar_num_objects_minus1 shall be in the range of 0 to 255.

ar_object_idx[i] specifies the index of the object present in the list of objects present in the current coded picture. ar_object_idx[i] shall be in the range of 0 to 255.

ar_new_object_flag[ar_object_idx[i]] equal to 1 indicates that the corresponding object was not represented in earlier annotated region SEI messages within the persistence scope. ar_new_object_flag[ar_object_idx[i]] equal to 0 indicates that the corresponding object was represented in earlier annotated region SEI messages within the persistence scope.

ar_object_bounding_box_update_flag[ar_object_idx[i]] equal to 1 indicates that the bounding box of the corresponding object has been changed from the values represented in earlier annotated region SEI messages within the persistence scope. ar_object_bounding_box_update_flag[ar_object_idx[i]] equal to 0 indicates that the bounding box of the corresponding object persists from earlier annotated region SEI messages within the persistence scope.

ar_object_label_idc[ar_object_idx[i]] specifies the index of the label corresponding to the object. The value of ar_object_label_idc[ar_object_idx[i]] persists from earlier annotated region SEI messages within the persistence scope. If ar_object_label_idc[ar_object_idx[i]] was not present in earlier annotated region SEI messages within the persistence scope, its value is undefined.

ar_partial_object_flag[ar_object_idx[i]] equal to 1 indicates that ar_object_top, ar_object_left, ar_object_width and ar_object_height[ar_object_idx[i]] syntax elements represent the size and location of an object that is only partially visible within the coded picture. ar_partial_object_flag[ar_object_idx [i]] equal to 0 indicates that ar_object_top, ar_object_left, ar_object_width and ar_object_height[ar_object_idx[i]] syntax elements represent the size and location of an object that is fully visible within the coded picture.

ar_object_top[ar_object_idx[i]] and ar_object_left[ar_object_idx[i]] specify, as luma samples, the top and left location, respectively, of the ar_object_idx[i]-th object in the decoded picture. The values of ar_object_left[ar_object_idx[i]] shall be in the range of 0 to pic_width_in_luma_samples inclusive and the value of ar_object_top[ar_object_idx[i]] will be in the range of 0 to pic_height_in_luma_samples inclusive. The values of ar_object_top[ar_object_idx[i]] and ar_object_left[ar_object_idx[i]] persist from earlier annotated region SEI messages within the persistence scope. If ar_object_top[ar_object_idx[i]] or ar_object_left[ar_object_idx[i]] were not present in earlier annotated region SEI messages within the persistence scope, their values are undefined.

ar_object_width [ar_object_idx[i]] and ar_object_height[ar_object_idx[i]] specify as luma samples the width and height, respectively, of the ar_object_idx[i]-th object in the decoded picture. When the ar_partial_object_flag_present_flag is 0, the value of ar_object_left[ar_object_idx[i]]+ar_object_width[ar_object_idx[i]] shall be in the range of 0 to pic_width_in_luma_samples inclusive and the value of ar_object_top[ar_object_idx[i]]+ar_object_height[ar_object_idx[i]] shall be in the range of 0 to pic_height_in_luma_samples inclusive. The values of ar_object_width[ar_object_idx[i]] and ar_object_height[ar_object_idx[i]] persist from earlier annotated region SEI messages within the persistence scope. If ar_object_width[ar_object_idx[i]] or ar_object_height[ar_object_idx[i]] was not present in earlier annotated region SEI messages within the persistence scope, their values are undefined.

ar_object_class_detection_confidence[ar_object_idx[i]] specifies the confidence associated with the ar_object_idx[i]-th object, in units of $2^{ar\_object\_detection\_confidence\_precision\_num\_bits}$. The length of the ar_object_class_detection_confidence[ar_object_idx[i]] syntax element is ar_object_detection_confidence_precision_num_bits bits. The value of ar_object_class_detection_confidence[ar_object_idx[i]] persists from earlier annotated region SEI messages within the persistence scope. If ar_object_class_detection_confidence[ar_object_idx[i]] was not present in earlier annotated region SEI messages within the persistence scope, its value is undefined.

Figure 5:
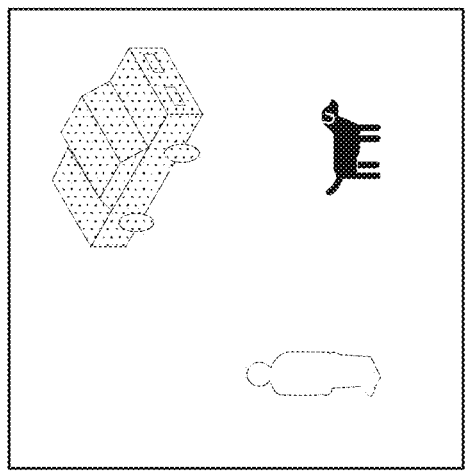
FIG. 5 is an illustration of pictures for which video analytics metadata has been generated according to some embodiments.
Figure 5:
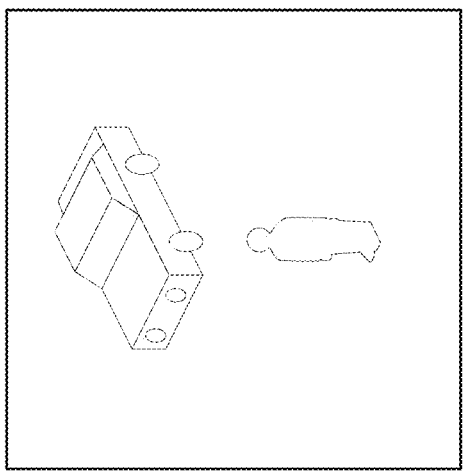
Figure 5:
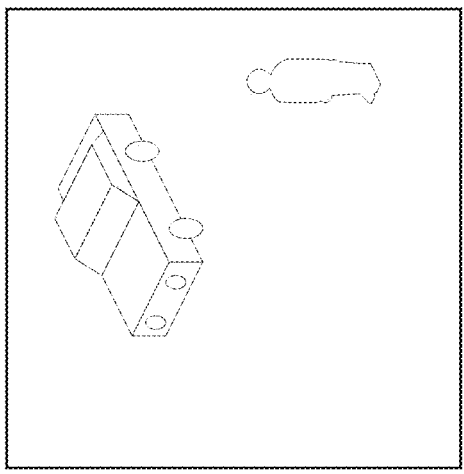

FIG. 5 is an illustration of pictures for which video analytics metadata has been generated according to some embodiments. FIG. 5 illustrates a sequence of three pictures in a video stream, the pictures being Picture 0, Picture 1, and Picture 2.

Picture 0—At Picture 0, there are two objects are present in the image, the two objects being a car and a person. Picture 0 key syntax may include the following:

TABLE 2

| Picture 0 Syntax | |
|---|---|
| ar_object_label_present_flag | 1 |
| ar_num_new_labels | 2 |
| ar_label_idx[ 0 ] | 0 |
| ar_label_idx[ 1 ] | 1 |
| ar_label[ 0 ] | Car |
| ar_label[ 1 ] | Person |
| ar_num_objects_minus1 | 1 |
| ar_object_idx[ 0 ] | 0 |
| ar_new_object_flag[ 0 ] | 1 |
| ar_object_idx[ 1 ] | 1 |
| ar_new_object_flag[ 1 ] | 1 |
| ar_object_label_idc[ 0 ] | 0 |
| ar_object_label_idc[ 1 ] | 1 |
| ar_object_top, left, width, height[ 0 ] | BB_A |
| ar_object_top, left, width, height[ 1 ] | BB_B |

Picture 1—At Picture 1, the car (Object 0) has remained in the same position, while and the person (Object 1) has moved to a new position. Picture 1 key syntax may include the following:

TABLE 2

| Picture 1 Syntax | |
|---|---|
| ar_object_label_present_flag | 1 |
| ar_num_new_labels | 0 |
| ar_num_objects_minus1 | 1 |
| ar_object_idx[ 0 ] | 0 |
| ar_new_object_flag[ 0 ] | 0 |
| ar_object_bounding_box_update_flag[ 0 ] | 0 |
| ar_object_idx[ 1 ] | 1 |
| ar_new_object_flag[ 1 ] | 0 |
| ar_object_bounding_box_update_flag[ 1 ] | 1 |
| ar_object_top, left, width, height[ 1 ] | BB_C |

In such syntax, the position of the car (Object 0) persists from Picture 0, as BB_A.

Picture 2—At picture 2, the first car (Object 0) is no longer in the picture, the person (object 1) has moved within the picture, a different car (Object 2) has entered the picture, and a dog (Object 3) has entered the picture. Picture 2 key syntax may include the following:

| | |
|---|---|
| ar_object_label_present_flag | 1 |
| ar_num_new_labels | 1 |
| ar_label_idx[ 0 ] | 2 |
| ar_label[ 2 ] | dog |
| ar_num_objects_minus1 | 2 |
| ar_object_idx[ 0 ] | 1 |
| ar_new_object_flag[ 1 ] | 0 |
| ar_object_bounding_box_update_flag[ 1 ] | 1 |
| ar_object_idx[ 1 ] | 2 |
| ar_new_object_flag[ 2 ] | 1 |
| ar_object_label_idc[ 2 ] | 0 |
| ar_object_idx[ 2 ] | 3 |
| ar_new_object_flag[ 3 ] | 1 |
| ar_object_label_idc[ 3 ] | 2 |
| ar_object_top, left, width, height[ 1 ] | BB_D |
| ar_object_top, left, width, height[ 2 ] | BB_E |
| ar_object_top, left, width, height[ 3 ] | BB_F |

Figure 6:
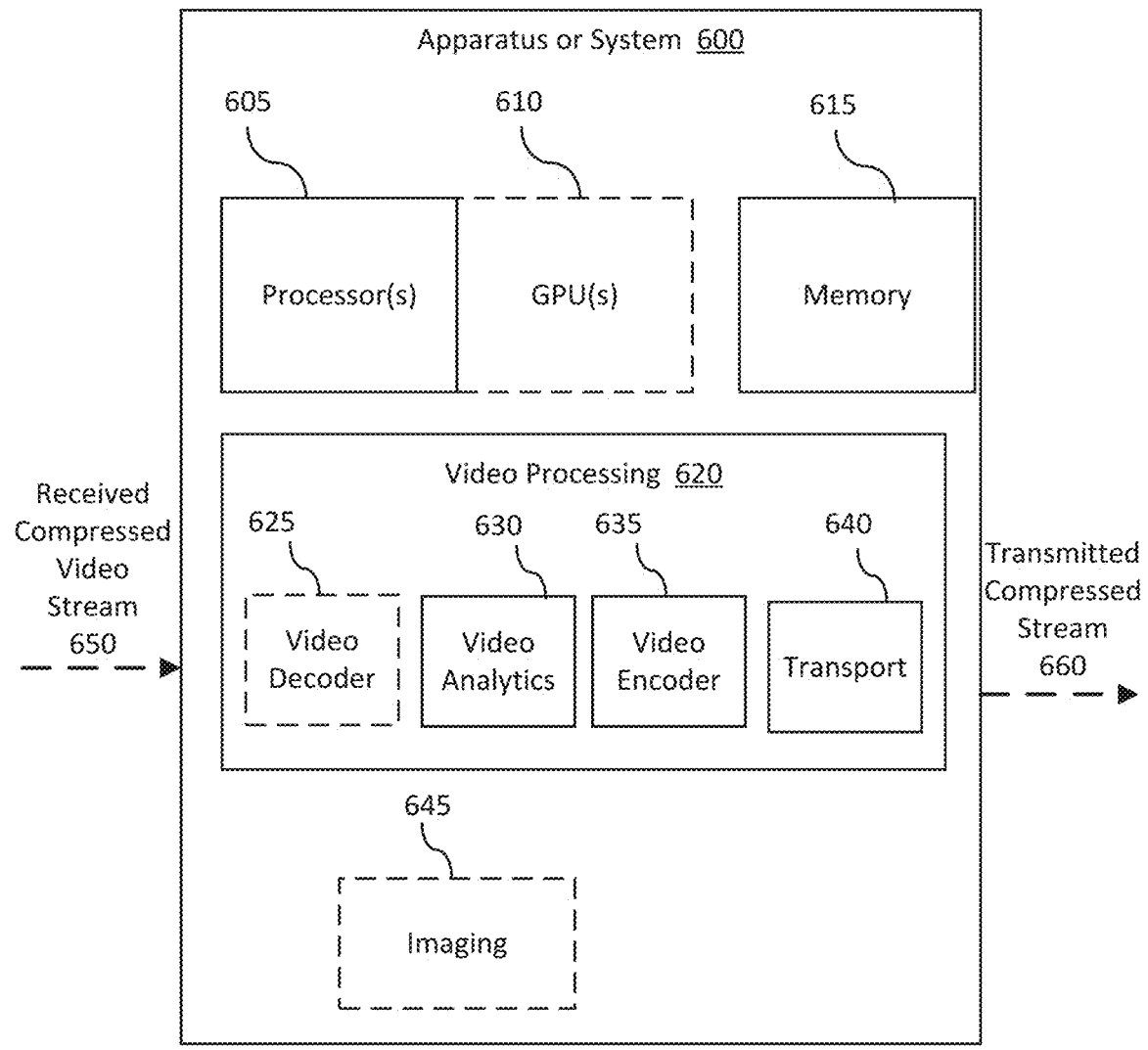
FIG. 6 illustrates an apparatus or system to provide video analytics encoding according to some embodiments.

FIG. 6 illustrates an apparatus or system to provide video analytics encoding according to some embodiments. Apparatus or system 600 represents a communication and data processing device including but not limited to a smart camera, IP camera, edge camera, video streaming box, video scoring system, network video recorder, video DL (Deep Learning) training server, video scoring server, video storage streaming server, video application server, or other apparatus or system of a video analysis pipeline. In some embodiments, apparatus or system 600 may include (without limitation) autonomous machines or artificially intelligent agents, such as a mechanical agents or machines, electronics agents or machines, virtual agents or machines, electro-mechanical agents or machines, etc.

In some embodiments, an apparatus or system 600 includes one or more processors 605 (which may include one or more CPUs (Central Processing Units)), having one or more processor cores, and may include one or more GPUs 610 having one or more graphics processor cores, wherein the GPUs 610 may be included within or separate from the one or more processors 605. However, embodiments are not limited to this particular processing structure. In some embodiments, the apparatus or system 600 further includes a memory 615 to store data, including video data.

In some embodiments, the apparatus or system 600 includes video processing elements 620, which may include, but are not limited to, a video decoder 625 that may provide for decompression of compressed video data. Video processing 620 may further include a video analytics mechanism 630, which may include video analytics circuitry, to provide analysis of video data. In some embodiments, the video analysis is to be inserted as metadata into an SEI message. Video processing 620 may further include a video encoder 635 to provide for compression of video data. Video processing 620 may further include a transport mechanism 640, which may include transport circuitry, to perform transmission of video data and associated metadata with video analysis. In some embodiments, the apparatus of system 600 may be an edge camera including an imaging mechanism 645, wherein the imaging mechanism may include elements such as one or more lens and an image sensor. Other details regarding the components of an imaging mechanism are beyond the scope of the present application and are not presented here.

In some embodiments, the apparatus or system 600, such as an apparatus or system receiving data from a preceding apparatus or system in a video analytics pipeline, may receive a compressed video stream 650 for decoding and analysis by the video processing elements 620.

In some embodiments, the apparatus or system 600, such as an apparatus or system transmitting data to a preceding apparatus or system in a video analytics pipeline, may transmit a compressed video stream 660 for handling by the preceding apparatus or system, which may include decoding and analysis.

In some embodiments, the apparatus or system 600 may further include an edge device, wherein the edge device may be a device to utilize received video data in one or more applications. In some embodiments, the edge device includes an interface to receive data from a preceding apparatus or system in a video analytics pipeline, the data including encoded data for video streaming and a message including video analytics metadata for the encoded data. In some embodiments, the edge device includes the video processing elements 620, wherein the video processing elements 620 include the video decoder to decode the received video data to generate a decoded video stream, and further are to obtain video analytics from the received video analytics metadata. In some embodiments, the edge device is to apply the video analytics to the decoded video stream. In some embodiments, a received message includes video analytics from a plurality of preceding apparatuses or systems in the video analytics pipeline.

Figure 7:
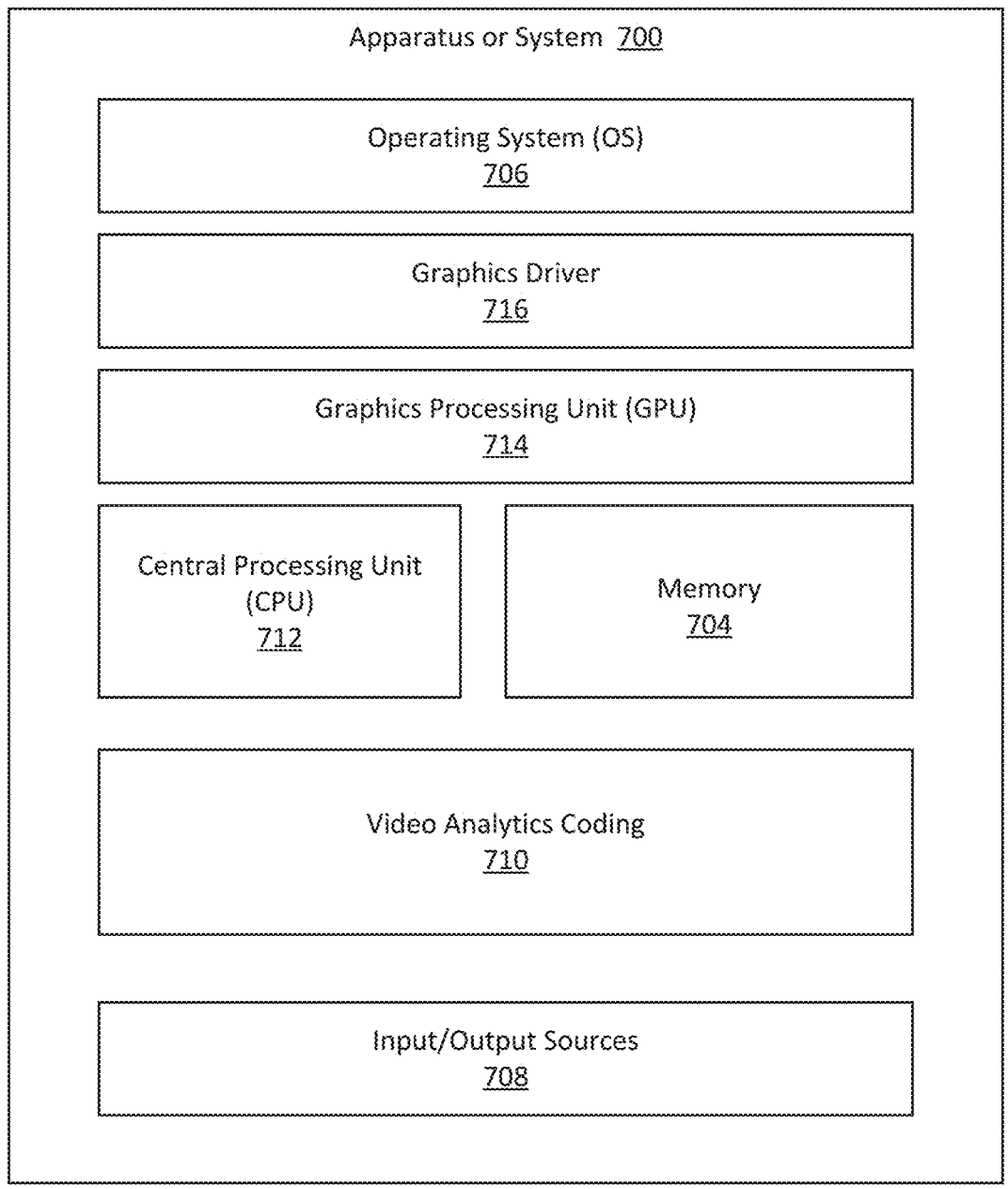
FIG. 7 illustrates an apparatus or system including video analytics encoding to provide improved efficiency of video processing and compression according to some embodiments.

FIG. 7 illustrates an apparatus or system including video analytics encoding to provide improved efficiency of video processing and compression according to some embodiments. For example, in one embodiment, a video analytics coding mechanism 710 of FIG. 7 may be employed or hosted by an apparatus or system 700, such as computing device 800 of FIG. 8. Apparatus or system 700 represents a communication and data processing device including but not limited to a smart camera, IP camera, edge camera, video streaming box, video scoring system, network video recorder, video DL (Deep Learning) training server, video scoring server, video storage streaming server, video application server, or other apparatus or system of a video analysis pipeline. In some embodiments, apparatus or system 700 may include (without limitation) autonomous machines or artificially intelligent agents, such as a mechanical agents or machines, electronics agents or machines, virtual agents or machines, electro-mechanical agents or machines, etc.

Further, for example, apparatus or system 700 may include a computer platform hosting an integrated circuit ("IC"), such as a system on a chip ("SoC" or "SOC"), integrating various hardware and/or software components of apparatus or system 700 on a single chip.

As illustrated, in one embodiment, apparatus or system 700 may include any number and type of hardware and/or software components, such as (without limitation) graphics processing unit 714 ("GPU" or simply "graphics processor"), graphics driver 716 (also referred to as "GPU driver", "graphics driver logic", "driver logic", user-mode driver (UMD), user-mode driver framework (UMDF), or simply "driver"), central processing unit 712 ("CPU" or simply "application processor"), memory 704, network devices, drivers, or the like, as well as input/output (IO) sources 708, such as touchscreens, touch panels, touch pads, virtual or regular keyboards, virtual or regular mice, ports, connectors, etc. Apparatus or system 700 may include an operating system (OS) serving as an interface between hardware and/or physical resources of apparatus or system 700 and a user.

It is to be appreciated that a lesser or more equipped system than the example described above may be preferred for certain implementations. Therefore, the configuration of apparatus or system 700 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, video analytics coding mechanism 710 may be hosted by memory 704 of apparatus or system 700. In another embodiment, video analytics coding mechanism 710 may be hosted by or be part of operating system 706 of apparatus or system 700. In another embodiment, video analytics coding mechanism 710 may be hosted or facilitated by graphics driver 716. In yet another embodiment, video analytics coding mechanism 710 may be hosted by or part of graphics processing unit 714 ("GPU" or simply "graphics processor") or firmware of graphics processor 714. For example, video analytics coding mechanism 710 may be embedded in or implemented as part of the processing hardware of graphics processor 712. Similarly, in yet another embodiment, video analytics coding mechanism 710 may be hosted by or part of central processing unit 712 ("CPU" or simply "application processor"). For example, video analytics coding mechanism 710 may be embedded in or implemented as part of the processing hardware of application processor 712.

In yet another embodiment, apparatus or system 710 may be hosted by or part of any number and type of components of apparatus or system 700, such as a portion of video analytics coding mechanism 710 may be hosted by or part of operating system 706, another portion may be hosted by or part of graphics processor 714, another portion may be hosted by or part of application processor 712, while one or more portions of video analytics coding mechanism 710 may be hosted by or part of operating system 706 and/or any number and type of devices of apparatus or system 700. It is contemplated that embodiments are not limited to certain implementation or hosting of video analytics coding mechanism 710 and that one or more portions or components of video analytics coding mechanism 710 may be employed or implemented as hardware, software, or any combination thereof, such as firmware.

Apparatus or system 700 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 8:
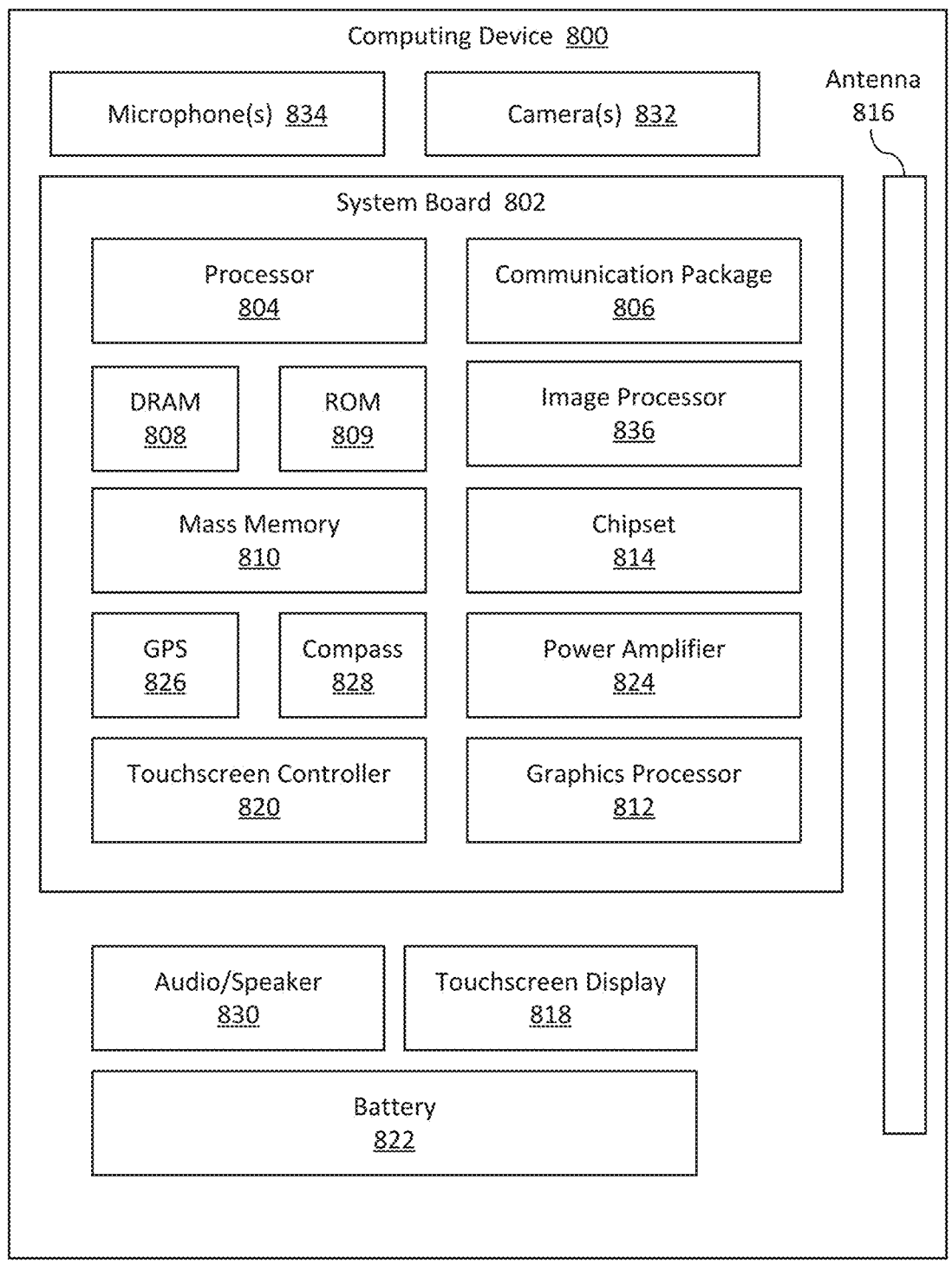
FIG. 8 illustrates a computing device according to some embodiments.

FIG. 8 illustrates a computing device according to some embodiments. It is contemplated that details of computing device 800 may be the same as or similar to details of apparatus or system 700 of FIG. 7 and thus for brevity, certain of the details discussed with reference to apparatus or system 700 of FIG. 7 are not discussed or repeated hereafter. Computing device 800 houses a system board 802 (which may also be referred to as a motherboard, main circuit board, or other terms)). The system board 802 may include a number of components, including but not limited to a processor 804 and at least one communication package or chip 806. The communication package 806 is coupled to one or more antennas 816. The processor 804 is physically and electrically coupled to the board 802.

Depending on its applications, computing device 800 may include other components that may or may not be physically and electrically coupled to the system board 802. These other components include, but are not limited to, volatile memory (e.g., DRAM) 808, nonvolatile memory (e.g., ROM) 809, flash memory (not shown), a graphics processor 812, a digital signal processor (not shown), a crypto processor (not shown), a chipset 814, an antenna 816, a display 818 such as a touchscreen display, a touchscreen controller 820, a battery 822, an audio codec (not shown), a video codec (not shown), a power amplifier 824, a global positioning system (GPS) device 826, a compass 828, an accelerometer (not shown), a gyroscope (not shown), a speaker or other audio element 830, one or more cameras 832, a microphone array 834, and a mass storage device (such as hard disk drive) 810, compact disk (CD) (not shown), digital versatile disk (DVD) (not shown), and so forth). These components may be connected to the system board 802, mounted to the system board, or combined with any of the other components.

The communication package 806 enables wireless and/or wired communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 806 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 800 may include a plurality of communication packages 806. For instance, a first communication package 806 may be dedicated to shorter range wireless communications such as Wi-Fi and Bluetooth and a second communication package 806 may be dedicated to longer range wireless communications such as GSM, EDGE, GPRS, CDMA, WiMAX, LTE, Ev-DO, and others.

The cameras 832 including any depth sensors or proximity sensor are coupled to an optional image processor 836 to perform conversions, analysis, noise reduction, comparisons, depth or distance analysis, image understanding, and other processes as described herein. The processor 804 is coupled to the image processor 836 to drive the process with interrupts, set parameters, and control operations of image processor and the cameras. Image processing may instead be performed in the processor 804, the graphics processor 812, the cameras 832, or in any other device.

In various implementations, the computing device 800 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 800 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

In some embodiments, an apparatus includes a memory to store data, including data for video streaming; and a video processing mechanism, wherein the video processing mechanism is to analyze video data and generate video analytics, generate metadata representing the video analytics and insert the generated video analytics metadata into a message, and transmit the video data and the metadata to a succeeding apparatus or system in a video analytics pipeline, the video data being compressed video data.

In some embodiments, the apparatus further includes an imaging mechanism to capture images of a scene and generate the video data.

In some embodiments, the video processing mechanism is to compress the video data prior to transmission of the video data.

In some embodiments, the apparatus is an edge device to provide video imaging.

In some embodiments, the apparatus is one of a smart camera or IP (Internet Protocol) camera.

In some embodiments, the video processing mechanism is further to receive a compressed video stream from a preceding apparatus or system in the video analytics pipeline and decode the compressed video stream to generate the video data for analysis.

In some embodiments, transmitting the video data includes transmitting the received compressed video stream without re-compression of the video data.

In some embodiments, the apparatus is one or a gateway or edge device.

In some embodiments, the video processing mechanism is further to receive a message including video analytics metadata from the preceding apparatus or system in the video analytics pipeline, and wherein inserting the generated video analytics data into a message includes inserting the generated video data into the received message.

In some embodiments, parameters within the message persist in a following message, the position of static existing object being maintained and only new objects or moving existing objects requiring updating in the later message.

In some embodiments, the metadata includes one or more of a flag to indicate that a decoded image is not optimized for user viewing, a flag to indicate that motion information in an image was selected to accurately represent object motion, or a flag to indicate presence of an object detection confidence value.

In some embodiments, the message is a Supplemental Enhancement Information (SEI) message that is carried in the Network Abstraction Layer (NAL).

In some embodiments, the analysis of the video data includes one or more of computer vision, machine learning, or deep learning.

In some embodiments, a method includes analyzing video data and generate video analytics at an apparatus or system in a video analytics pipeline; generating metadata representing the video analytics and inserting the generated video analytics metadata into a message; and transmitting the video data and the metadata to a succeeding apparatus or system in the video analytics pipeline, the video data being compressed video data.

In some embodiments, the method further includes capturing images of a scene to generate the video data; and compressing the video data prior to transmission of the video data.

In some embodiments, the apparatus or system is an edge device including an imaging mechanism.

In some embodiments, the method further includes receiving a compressed video stream from a preceding apparatus or system in the video analytics pipeline; and decoding the compressed video stream to generate the video data for analysis.

In some embodiments, transmitting the video data includes transmitting the received compressed video stream without re-compression of the video data.

In some embodiments, the method further includes receiving a message including video analytics metadata from the preceding apparatus or system in the video analytics pipeline, wherein inserting the generated video analytics data into a message includes inserting the generated video data into the received message.

In some embodiments, the message is a Supplemental Enhancement Information (SEI) message that is carried in the Network Abstraction Layer (NAL).

In some embodiments, generating the video analytics includes generating one or more labels for objects within the video data, wherein more than one object may share a generated label.

In some embodiments, a system includes one or more processors to process video data; a memory to store data, including data for video streaming; and a video processing mechanism including a video analytics mechanism to analyze video data and generate video analytics, a video encoder to encode video data for transmission, and a transport mechanism to perform transmission of video data and other data, wherein the video processing mechanism is to generate metadata representing the video analytics and insert the generated video analytics metadata into a message and transmit the video data and the metadata to a succeeding apparatus or system in a video analytics pipeline, the video data being compressed video data.

In some embodiments, the system further includes an imaging mechanism to capture images of a scene and generate the video data.

In some embodiments, the video processing mechanism is to compress the video data prior to transmission of the video data.

In some embodiments, wherein the video processing mechanism is further to receive a compressed video stream from a preceding apparatus or system in the video analytics pipeline; and the system further includes a video decoder to decode the compressed video stream and generate the video data for analysis.

In some embodiments, transmitting the video data includes transmitting the received compressed video stream without re-compression of the video data.

In some embodiments, the video processing mechanism is further to receive a message including video analytics metadata from the preceding apparatus or system in the video analytics pipeline, and wherein inserting the generated video analytics data into a message includes inserting the generated video data into the received message.

In some embodiments, an edge device includes an interface to receive data from a preceding apparatus or system in a video analytics pipeline, the data including encoded data for video streaming and a message including video analytics metadata for the encoded data; and a video processing mechanism, wherein the video processing mechanism is to decode the received video data to generate a decoded video stream and is to obtain video analytics from the video analytics metadata.

In some embodiments, the edge device is to apply the video analytics to the decoded video stream.

In some embodiments, the message includes video analytics from a plurality of preceding apparatuses or systems in the video analytics pipeline.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   a memory to store data, including data for video streaming; and
   a video processing circuitry to receive and process video data of a compressed video stream, wherein the video data is processed by the video processing circuitry while the compressed video stream remains compressed, wherein processing of the video data includes:
      analyzing the video data of the compressed video stream and generate video analytics associated with the compressed video stream,
      generating metadata representing the video analytics and insert the generated video analytics metadata into a message associated with the compressed video stream, and
      transmitting the video data and the metadata of the compressed video stream to a succeeding apparatus or system in a video analytics pipeline, wherein the video data and the video analytics are processed separately at the video analytics pipeline such that the video analytics is accessed through the metadata enabling processing of the video analytics without necessitating repetitive encoding of the video data at interfaces between stages associated with the video analytics pipeline.

2. The apparatus of claim 1, wherein the apparatus is an edge device to provide video imaging, wherein the apparatus is one of a gateway or edge device.

3. The apparatus of claim 2, wherein the apparatus is one of a smart camera or IP (Internet Protocol) camera.

4. The apparatus of claim 1, wherein the video processing circuitry is further to receive a message including video analytics metadata from the preceding apparatus or system in the video analytics pipeline, and wherein inserting the generated video analytics data into a message includes inserting the generated video data into the received message.

5. The apparatus of claim 1, wherein parameters within the message persist in a following message, the position of static existing object being maintained and only new objects or moving existing objects requiring updating in the later message.

6. The apparatus of claim 1, wherein the metadata includes one or more of the following:
   a flag to indicate that a decoded image is not optimized for user viewing;
   a flag to indicate that motion information in an image was selected to accurately represent object motion; or
   a flag to indicate presence of an object detection confidence value.

7. The apparatus of claim 1, wherein the message is a Supplemental Enhancement Information (SEI) message that is carried in the Network Abstraction Layer (NAL).

8. The apparatus of claim 1, wherein the analysis of the video data includes one or more of computer vision, machine learning, or deep learning.

9. A method comprising:
receiving and processing video data of a compressed video stream while the compressed video stream remains compressed, wherein processing of the video data includes:
analyzing the video data of the compressed video stream and generate video analytics associated with the compressed video stream at an apparatus or system in a video analytics pipeline;
generating metadata representing the video analytics and insert the generated video analytics metadata into a message associated with the compressed video stream; and
transmitting the video data and the metadata of the compressed video stream to a succeeding apparatus or system in the video analytics pipeline, wherein the video data and the video analytics are processed separately at the video analytics pipeline such that the video analytics is accessed through the metadata enabling processing of the video analytics without necessitating repetitive encoding of the video data at interfaces between stages associated with the video analytics pipeline.

10. The method of claim 9, further comprising:
receiving a message including video analytics metadata from the preceding apparatus or system in the video analytics pipeline,
wherein inserting the generated video analytics data into a message includes inserting the generated video analytics data into the received message.

11. The method of claim 9, wherein generating the video analytics includes generating one or more labels for objects within the video data, wherein more than one object may share a generated label.

12. A non-transitory computer-readable medium having stored thereon instructions which, when executed, cause a computing device to perform operations comprising:
receiving and processing video data of a compressed video stream while the compressed video stream remains compressed, wherein processing of the video data includes:
analyzing the video data of the compressed video stream and generate video analytics associated with the compressed video stream at an apparatus or system in a video analytics pipeline;
generating metadata representing the video analytics and insert the generated video analytics metadata into a message associated with the compressed video stream; and
transmitting the video data and the metadata of the compressed video stream to a succeeding apparatus or system in the video analytics pipeline, the video data being compressed video data.

13. The non-transitory computer-readable medium of claim 12, wherein the operations comprise:
receiving a message including video analytics metadata from the preceding apparatus or system in the video analytics pipeline,
wherein inserting the generated video analytics data into a message includes inserting the generated video analytics data into the received message.

14. The non-transitory computer-readable medium of claim 12, wherein generating the video analytics includes generating one or more labels for objects within the video data, wherein more than one object may share a generated label.

* * * * *